United States Patent [19]

Greslin et al.

[11] Patent Number: 4,498,234
[45] Date of Patent: Feb. 12, 1985

[54] AUTOMATIC APPARATUS FOR FITTING OBJECTS INTO RECEPTACLES

[75] Inventors: Bernard P. Greslin, Rixheim; Daniel J. Rohmer, Herrlisheim, both of France

[73] Assignee: Manufacture de Machines du Haut-Rhin, Mulhouse, France

[21] Appl. No.: 459,681

[22] Filed: Jan. 20, 1983

[30] Foreign Application Priority Data

Jan. 20, 1982 [FR] France ................. 82 00801

[51] Int. Cl.³ .............. B23P 21/00; B21D 51/54; F42B 7/02
[52] U.S. Cl. ......................... 29/785; 29/1.3; 86/12
[58] Field of Search ........... 86/10, 12, 36; 29/1.3, 29/1.31, 1.32, 783, 785, 787, 790, 792

[56] References Cited

U.S. PATENT DOCUMENTS

| | | | |
|---|---|---|---|
| 2,506,144 | 5/1950 | Fischer | 86/12 |
| 2,514,946 | 7/1950 | Gagne | 86/12 |
| 2,715,962 | 8/1955 | Messinger | 86/12 |

Primary Examiner—Howard N. Goldberg
Assistant Examiner—Steven E. Nichols

[57] ABSTRACT

An apparatus for fitting receptacles at a predetermined spacing with respective substantially identical objects each having a bottom face has a plate generally centered on an upright plate axis and having a substantially planar, smooth, and horizontal upper face with a generally circular outer edge. A feeder deposits the objects on the upper face of the plate radially inward of the edge thereof such that these objects sit on this upper plate face by their bottom faces. A plurality of individual seats distributed at the spacing of the receptacles along the outer edge of the upper face of the plate each have a floor coplanar with the upper plate face and a shape complementary with that of one of the objects. A guide member has an inner edge above the upper face of the plate immediately adjacent same, and a plurality of respective passages which each open at one end at this inner edge and at the other end at the respective seat. Each such passage is so dimensioned that the objects can pass one by one from the respective inner edge to the respective seat. A drive rotates the plate relative to a fixed support in a predetermined direction about the plate axis. A radially outwardly directed force is exerted on the objects by rotating the plate at high speed to urge them toward the outer edge of the face and toward the seats via the passages of the guide member.

11 Claims, 7 Drawing Figures

FIG.1

FIG_2

AUTOMATIC APPARATUS FOR FITTING OBJECTS INTO RECEPTACLES

FIELD OF THE INVENTION

The present invention relates to an automatic apparatus for fitting objects, e.g. primer caps, into receptacles, e.g. shell casings. More particularly this invention concerns such an apparatus which automatically executes such fitting-together in a large-scale industrial process in which the receptacles are moving continuously at a fixed spacing in a row.

BACKGROUND OF THE INVENTION

Numerous industrial processes require that each of a multiplicity of identical objects be fitted to a respective receptacle in a predetermined position. This fitting-together must be carried out repeatedly and at high speed.

This is for example the case in capping bottles, which is done by moving the upright full bottles underneath a station at which caps are fitted to them, for example by press-fitting. This is also the procedure for fitting primer caps in the bases of ammunition casings, or in receptacles serving for subsequent transfer to such casings. Such a procedure is also used in numerous other areas, as for example in electronics for the placement and attachment of elements in printed circuits.

Most frequently these operations are carried out in steps, the movement of the receptacles being interrupted at each fitting operation since this operation takes place at a fixed station. To fit primer caps into the bases of casings, the casings are moved in a row one after the other under a fitting press which feeds the primer caps, for example from a hopper, one by one to a slide arrangement. When a casing is in the press, the movement of the row of casings is stopped and the press pushes the primer cap with the slide arrangement into the base of the thus arrested casing. The row of casings is then advanced one step, by the distance between two casings, and the operation is repeated. It is thus possible to fit about 80 to 120 caps per minute into the bases of respective casings.

This known procedure has several disadvantages. One of these disadvantages is that the stepwise movement of the receptacles is very hard on the conveyor mechanism and is quite noisy. Another disadvantage is that the procedure is slow, since mechanical considerations make a high production rate impossible. Even so this procedure is so fast that it creates feed problems. It is therefore possible that some casings are not fitted with a primer cap and that the unloaded casings must be found and culled out.

OBJECTS OF THE INVENTION

It is therefore an object of the present invention to provide an improved automatic apparatus for fitting objects to receptacles.

Another object is the provision of such an apparatus which overcomes the above-given disadvantages.

A yet further object is to provide an apparatus which operates continuously and which surely fits the objects to the receptacles, in particular into holes in the receptacles which are moving continuously in a row, no matter what these receptacles are, whether they be simple transfer accessories or items destined to form a finished product or parts of a finished product with the fitted-in objects.

SUMMARY OF THE INVENTION

These objects are attained according to the instant invention in such an apparatus for fitting receptacles at a predetermined spacing with respective substantially identical objects each having a bottom face. The apparatus has a plate generally centered on an upright plate axis and having a substantially planar, smooth, and horizontal upper face with a generally circular outer edge. Feed means is provided for depositing the objects on the upper face of the plate radially inward of the edge thereof such that these objects sit on this upper plate face by their bottom faces. A plurality of individual seats distributed at the spacing of the receptacles along the outer edge of the upper face of the plate each have a floor coplanar with the upper plate face and a shape complementary with that of one of the objects. A guide member has an inner edge above the upper face of the plate immediately adjacent same, and a plurality of respective passages which each open at one end at this inner edge and at the other end at the respective seat. Each such passage is so dimensioned that the objects can pass one by one from the respective inner edge to the respective seat. A drive rotates the plate relative to a fixed support in a predetermined direction about the plate axis. A radially outwardly directed force is exerted on the objects to urge them toward the outer edge of the face and toward the seats via the passages of the guide member.

With this system it is therefore possible to bring the objects up to the speed of the receptacles which are moving in a row and to fit them together as they travel together without relative movement. Since the operation is continuous it can take place at high speed. The guide member ensures that even relatively fragile or dangerous objects, such as primer caps, can be loaded onto the rotating plate near the center thereof at a location where the actual velocity of the deposition surface is very low, although the peripheral velocity of the plate might be quite large. The objects come up to speed as they move radially outward on the plate upper surface, and are automatically channeled by the passages to the seats.

In accordance with a feature of this invention the means for exerting a radially outwardly directed force on the objects includes means for rotating the plate about the plate axis at such a speed that the resultant centrifugal force moves the objects radially outward. Thus the objects are simply spun out on the plate face.

Each object according to this invention has perpendicular to the respective bottom face a predetermined height. The apparatus is further provided with a cover having a substantially planar and horizontal lower face spaced a distance from the upper plate face equal to slightly more than the predetermined object height. Thus the objects will be maintained in the orientation they are loaded in at, making it possible with this invention to fit odd-shaped objects to the receptacles.

According to the invention each passage opens at the inner edge of the guide member at a location offset upstream relative to the predetermined rotation direction from the respective seat. In addition the inner edge of the guide member has immediately downstream of each location of the inner edge of the guide member at which opens a passage a projection positioned to deflect the objects into the respective passage. Furthermore the guide member has immediately upstream of each location on the inner edge of the guide member at which opens a passage a radially inwardly open pocket for accumulating the objects. These objects therefore fill the pockets so that the passages will be assured a good supply of them. This system is much more likely to fill each and every receptacle than the prior-art arrangements with a positive feed.

It is also possible according to this invention for the means for exerting a radially outwardly directed force on the objects to have means for blowing a gas into the passages from the location at which same open at the inner edge of the guide member toward the respective seats. This prevents the objects from becoming jammed in the passages.

The apparatus of this invention has means for rotating the seats and the guide member about the plate axis relative to the plate and opposite to the predetermined direction. This can be done by jointly rotating the seats and the guide member about the plate axis relative to the plate in the predetermined direction at an angular speed smaller than that of the plate. Such operation, with the plate moving faster than the holders and seats allows the radially outwardly effective force that brings the objects up to speed to be considerable.

In accordance with this invention each recectacle has for the respective object a hole opening downward. In addition the apparatus has means including respective receptacle holders fixed relative to the seats and to the guide member for temporarily holding a respective receptacle above each seat in a position in which this receptacle is positioned with its hole for the object as an upper extension of the seat, these holders and their receptacles therefore orbiting about the plate axis as the plate rotates thereabout. A feeder supplies the receptacles to the holders and another similar mechanism takes the receptacles from the holders at respective intake and output stations along the outer plate edge during rotation of the seats and guide member. Respective punches at the seats in vertical alignment therewith are each vertically slidable relative to the respective seat and to the guide member and each have a substantially planar upper end movable between an upper position in which it is coplanar with the upper face of the plate to define the floor of the respective seat and a lower position in which it lies above the upper face of the plate. An actuator slides the punches as the seats and guide member orbit so that each punch is in the lower position in the intake station and moves into the upper position between the intake station and the output station for thereby pushing an object up into each hole as the respective receptacles travel from the intake to the takeoff stations.

This arrangement can work at very high speed to fit the objects accurately to the receptacles. At the intake station a receptacle is fitted to a holder, then as it orbits to the takeoff station an object is fitted to it, and it is lifted off the holder automatically at the takeoff station, without having stopped moving or changing spacing from the preceding and trailing receptcles. Exact positioning is easy to obtain, and the system will rarely not fill a receptacle with an object.

DESCRIPTION OF THE DRAWING

The above and other features and advantages will become more readily apparent from the following, reference being made to the accompanying drawing in which.

SPECIFIC DESCRIPTION

Figure 1:
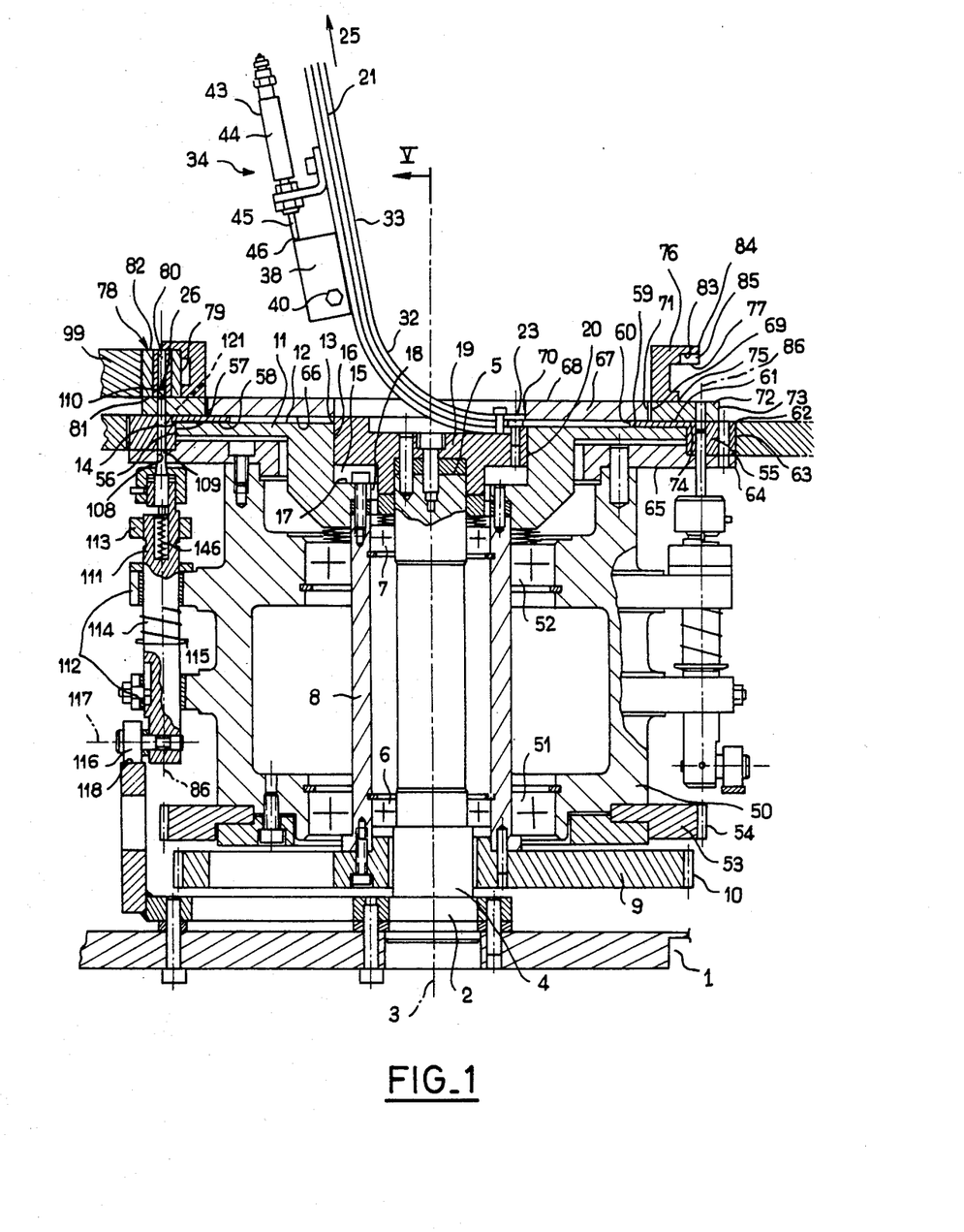
FIG. 1 is a view of the apparatus in a vertical axial plane shown at I—I in FIG. 2.

As seen in FIG. 1 a fixed support 1 has a vertical pivot 2 fixed on and above the support 1 and having a stepped outer edge 4 formed by several cylindrical surfaces centered on a common vertical axis 3. The pivot 2 has an upper face 5 transverse to the axis 3 and carries on its outer surface 4 respective inner races of lower and upper bearings 6 and 7 fixed against movement along the axis 3 and having respective outer races also fixed against movement along the axis 3. These outer races are carried inside a sleeve 8 centered on and rotatable about the axis 3 but nondisplaceable theralong.

At its lower portion the sleeve 8 is fixed to a gear 9 having outer teeth 10 meshing with a not illustrated drive pinion carried by a pneumatic drive that rotates the sleeve 8 relative to the pivot 2 about the axis 3. At its upper end the sleeve 8 is fixed to a plate 11 having a smooth and planar upper face 12 that is horizontal and perpendicular to the axis 3, and that has inner and outer circular edges 13 and 14 centered on the axis 3.

In its center the face 12 of the plate 11 is formed with a recess 15 defined by a cylindrical surface 16 centered on the axis 3 and ending at the inner edge 13 of the face 12, and by a planar base surface 17 extending perpendicular to the axis 3 and centrally traversed by a cylindrical bore 18 centered on the axis 3 and having a diameter that is identical to the inner diameter of the sleeve 8. The pivot 2 passes through this bore 18 of the plate 11 above whose face 17 is the upper transverse end 5 of the pivot 2. The inside of the recess 15 is solidly fixed to a plug 19 that consequently is fixed relative to the support 1.

The plug 19 has an outer cylindrical peripheral surface 20 centered on the axis 3 and having a diameter almost equal to that of the surface 16 of the plate 11 so that it is immediately juxtaposed with same without preventing rotation of the plate 11 fixed on the sleeve 8 relative to the plug 19. Preferably the surface 20 projects up above the surface 16 at an angle so as not to impede the primer-feed means which will be described below and so that the plug 19 defines a rim projecting up above the face 12 of the plate 11 at the inner edge 13 of same.

Figure 7:
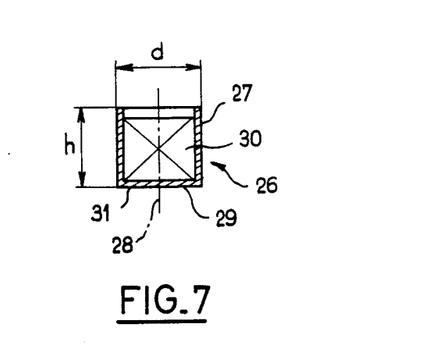
FIG. 7 is a large-scale view in axial section through an ammunition primer cap suitable for introduction into a receptacle moved continuously by the apparatus shown in FIGS. 1 to 6.

FIG. 7 shows a primer cap 26 of the known type. It has a cup-shaped jacket defined by a cylindrical side wall 27 centered on an axis 28 and by a base 29 perpendicular to the axis 28 and having an external flat bottom surface 31. The jacket 27, 29 contains a priming charge 30.

Figure 5:
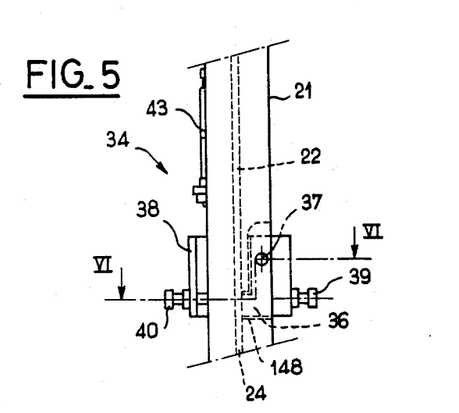
FIG. 5 is a detail view taken in the direction of arrow V of FIG. 1.
Figure 6:
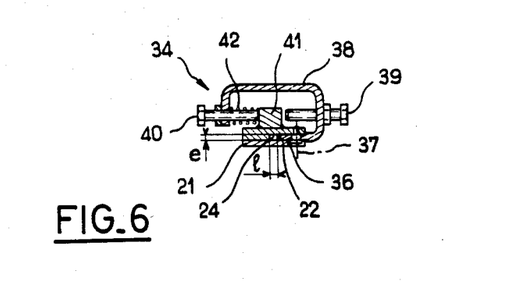
FIG. 6 is a section taken along line VI—VI of FIG. 5.

As also shown in FIGS. 5 and 6 primer-feed means opens at the upper face 12 of the plate 11 at the inner edge 13 of same and is in the illustrated example a tube 21 defining a passage 22 of rectangular cross section for longitudinally guiding while impeding tipping of primer caps 26 fed one by one into the passage 22. To this end the tube 21 has a lower end 23 by means of which it is fixed to the plug 19 and in which the passage 22 has a smooth and flat floor 24 coplanar with the face 12 of the plate 11 and opening on same at its inner edge 13. The passage 22 is dimensioned such that the caps 26 can slide along them in a row, resting on their bottoms faces 31 while their axes 28 extend perpendicular to the passage floor 24. The opposite upper end 25 of the tube 21 opens into an unillustrated apparatus of the type known per se, for instance of the vibrating-bowl type, which feeds the primer caps 26 one by one into the passage 22 in a predetermined position, here with the flat bottom surfaces resting on the floor 24 of the passage 22. The height e of the conduit 22, measured perpendicular to its floor 24 is generally equal to the height h of the primer cap 26 measured parallel to its axis 28 and the width 1 of the conduit 22, measured parallel to its floor 24 and perpendicular to the longitudinal direction of the conduit 22, is generally equal to the outside diameter d of the wall 27 of the primer cap 26.

The tube 21 bends progressively at an elbow 32 from a nearly vertical position with the axes 28 of the caps 26 in the passage 22 nearly horizontal to a horizontal position in which the lower end 23 of the passage 22 opens generally radially of and perpendicular to the axis 3. Above the elbow 32 the tube 21 has an inclined rectangular portion 33 provided with a device 34 serving to automatically temporarily interrupt the movement of the primer caps 26 along the passage 22 toward the upper face 12 of the plate 11 whenever means 35 shown in FIG. 2 and described in greater detail below detects an excess of primer caps 26 on this face 12.

This device 34, best shown in FIGS. 1, 5, and 6, has a finger 36 pivotal on the straight upper portion 33 of the tube 21 about an axis 37 perpendicular to the floor 24 of the passage 22 and capable either of extending into same through a passage 148 formed to this end in the tube portion 33 or of pulling out of same depending on the direction it is pivoted in.

The finger 36 is formed on a U-shaped holder or caliper 38 in in whose legs are threaded oppositely directed screws 39 and 40 cooperating with an abutment 41 fixed on the tube 21 so as to form adjustable stops that limit pivoting in the respective directions. Thus the depth of penetration of the finger 36 into the passage 22 when it has to interrupt the movement of primer caps 26 inside same can be set so that the finger 36 just barely touches against a primer cap 26 level with it with enough force to arrest it in the passage 22 but not enough to damage or crush it.

For safety's sake the caliper 38 is urged pivotally about the axis 37 by a compression spring 42 surrounding the screw 40 and braced on one side against the corresponding leg of the caliper 38 and on the other side against the abutment 41. The spring 42 pushes the finger 36 into the passage 22. Pivoting in the opposite direction is effected by feeding a fluid, e.g. air, to a single-acting cylinder 43 whose casing 44 is fixed on the tube 21 and whose piston rod 45 can extend into engagement against the caliper 38 at a corner 46 thereof. In this manner extension of the piston rod 45 pivots the caliper 38 in a direction pulling the finger 36 out of the conduit 22, which action compresses the spring 42. Thus in case of failure of pressurization of the cylinder 43 the spring 42 will maintain the caliper 38 in a position with the finger 36 blocking movement of the primer caps 26 along the passage 22 past itself.

Figure 2:
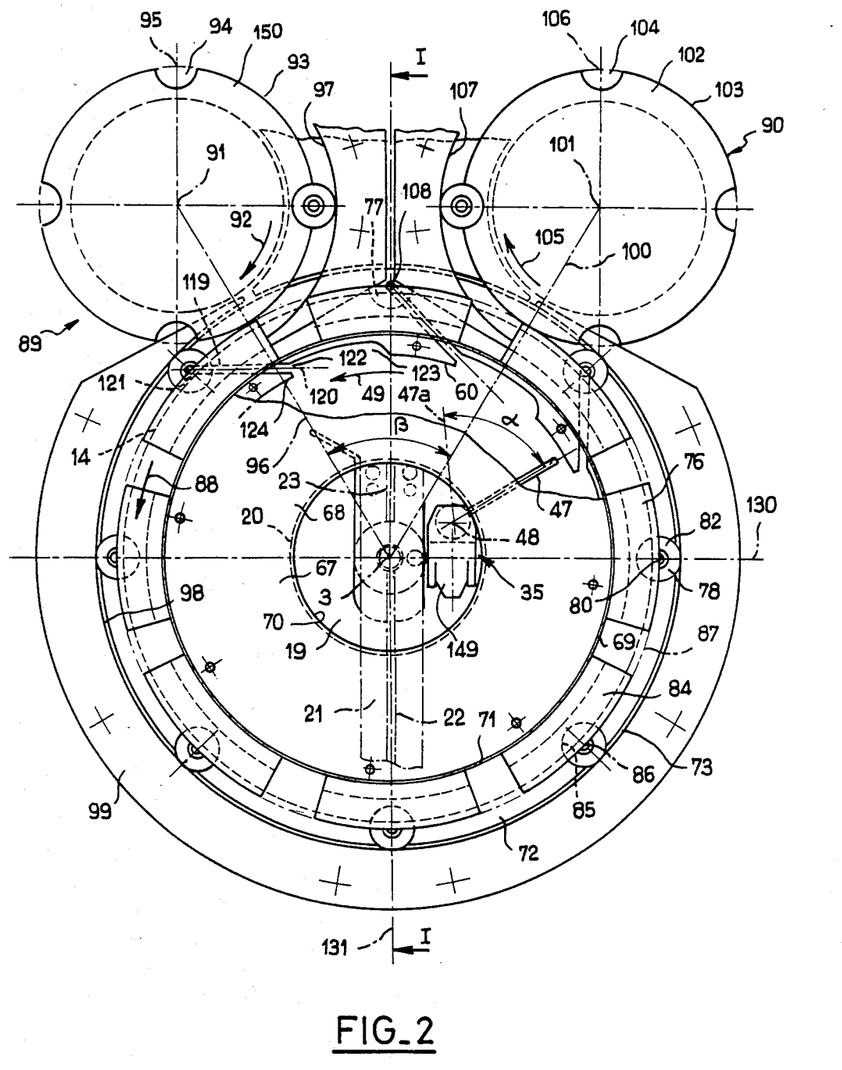
FIG. 2 is a top view of the apparatus shown in FIG. 1.

As shown in FIG. 2 the means 35 for detecting an overload of the upper face 12 of the plate 11 has an arm 47 positioned above and very close to this face 12 and pivotal on the plug 19 about an axis 48 parallel to the axis 3. This arm 48 is pivotally biased opposite the rotation direction 49 of the plate 11 about the axis 3 with respect to the pivot 2 so that absent other forces, it lies in the solid-line position of FIG. 2, that is extending generally radially of the axis 3. In this position the arm 47 trips a switch 149 mounted on the plug 19 and controlling pressurization of the cylinder 43. When tripped, the switch 149 opens a solenoid-controlled air valve and pressurizes the cylinder 43, thereby permitting movement of the primer caps 26 along the passage 22.

If the upper face 12 of the plate 11 is overloaded, that is if the primer caps 26 fed by the tube 21 onto this surface 12 are not taken away sufficiently rapidly by means which will be described below, these primer caps 26, which are moving in the rotation direction 49 with the plate 1 they are standing on, come angularly up against this arm 47 that is extending like a gate across the support surface 12. As the caps 26 build up upstream of this arm 47 they pivot it about its axis 48 in the same direction 49 through an angle alpha to a position 47a shown in dot-dash lines. In this position the arm 47 releases the switch 149 to interrupt pressurization of the cylinder 43. As described above, the spring 43 then rocks the caliper 38 to extend the finger 36 into the passage 22 and interrupt movement of the primer caps 26 therealong. Once the excess caps on the surrace 12 have been used up, the force acting on the arm 47 in the direction 49 decreases and the arm 47 can return to its starting position so as to retrip the switch 149 and thereby repressurize the cylinder 43 to free the flow of primer caps 26 in the passage 22.

It should be noted that the motor means acting on the gear 9 in the rotation direction off the sleeve 8 and of the plate 11 in the direction 49 about the axis 3 relative to the pivot imparts to these elements a speed such that the primer caps 26 deposited on the face 12 by the tube 21 migrate under the action of centrifugal force radially outward, that is toward the outer edge 14 of the face 12. During this entire movement along the passage 22 and over the face 12 these caps 26 sit and slide on their bottom faces 31 with their axes 28 perpendicular to the supporting surface.

It should be noted that the radially outwardly directed force applied centrifugally to the workpieces 26 to move them outward toward the outer edge of the face 12 could also be created otherwise. For example a blower that forms a current of air directed radially outward could assist the centrifugal force. Mechanism that does this will be described further on.

In addition to the assembly formed by the gear 9, the sleeve 8, and the plate 11 rotatable jointly about the axis 3 relative to the pivot, the illustrated embodiment of the apparatus according to the invention has a second assembly that is rotatable independently of the first above-described assembly. This second assembly is carried by a mount 50 surrounding the sleeve 8 and supported thereon by lower and upper bearings 51 and 52 having inner races fixed on the sleeve 8 against displacement parallel to the axis 3 and outer races fixed also against displacement parallel to the axis 3 on the mount 50.

At its lower portion immediately above the gear 9 the mount 50 has a gear 53 provided on its outer edge with teeth 54 meshing with an air-powered motor that can rotate the mount 50, and other elements supported by it and described below, relative to the sleeve 8 and to the elements carried by it about the axis 3 relative to the pivot 2.

At its upper portion, immediately next to the plate 11, the mount 50 is fixed to a ring 55 formed of several pieces for ease of assembly and surrounding the plate 11 in regions of same near the outer edge 14 of its upper face 12. The plate 11 has at the outer edge 14 of its face 12 a cylindrical outer peripheral surface 56 centered on the axis 3. The ring 55 has an inner cylindrical peripheral surface 57 centered on the axis 3 and having a diameter slightly greater than that of the surface 56 so as to be immediately juxtaposed therewith without impeding relative rotation of the plate 11 and the mount 50.

At the upper region of this surface 57 the ring 55 is formed with a radially inwardly extending ridge or rim 59 having a planar and annular face 58 extending perpendicular to the axis 3, directed downward, and positioned above and in immediate proximity to the outer edge of the face 12. The rim 59 has an inner edge or surface 60 that limits the centrifugally effected radially outward migration of the primer caps 26 on the face 12 of the plate 11 and positions these primer caps 26 at a predetermined spacing as will be described below. This inner peripheral surface 60 is perpendicular to the face 58 down to which it extends. The surface 60 is formed of a family of parallel lines parallel to the axis 3, but otherwise its shape will be described below.

The ring 55 has an annular and planar upper face 61 perpendicular to the axis 3 and having a circular outer edge 62 down from which extends an outer cylindrical peripheral surface 63 centered on the axis 3 and having a diameter greater than that of the surface 57. Toward the bottom this outer ring surface 63 is attached at a circular outer edge 64 centered on the axis 3 with a planar lower face 65 of the ring 55 transverse to the axis 3.

The thickness of the rim 59, measured parallel to the axis 3, that is the distance separating the faces 58 and 61, should be only slightly more than the height h of a primer cap 26.

Supported on the inner edge of the upper face 61 of the ring 55 is the outer portion of the planar bottom face 66 of an annular cover plate 67 lying in a plane perpendicular to the axis 3. This cover 67 has a planar upper face 68 perpendicular to the axis 3, a cylindrical outer peripheral surface 69 centered on the axis 3 and having a diameter smaller than that of the inner surface 57 of the ring 55 and larger than that of the inner peripheral surface 60 of the rim 59, and an inner cylindrical peripheral surface 70 centered on the axis 3 and having a diameter slightly smaller than that of the surface 16 of the plate 11 which is the same as that of the outer peripheral surface 20 of the plug 19. Thus the cover 67 overlies with its face 66 the annular strip of the upper face 12 of the plate 11 lying between its inner edge 13 and the inner peripheral surface 60 of the rim 59 of the ring 55. The cover 67 further is spaced from the face 12 by a vertical distance equal to slightly more than the height h of a primer cap 26. Thus the primer caps 26 cannot tip over as they migrate radially outward on the upper face 12 of the plate 11.

The cover 67 faces at its outer peripheral surface 69 an inner cylindrical peripheral surface 71 centered on the axis 3 and of a diameter near that of the surface 69. This surface 71 is formed on a rectangular-section ring 72 fixed like the cover 67 on the ring 55. The ring 72 is also defined by a cylindrical outer peripheral surface 73 centered on the axis 3, of a diameter greater than that of the surface 57 of the ring 55 and smaller than that of its surface 63, by a planar lower face 74 transverse to the axis 3 and coplanar with the upper face 61 of the ring 55, and by a planar upper face 75 transverse to the axis 3 and coplanar with the upper face 68 of the cover 67.

The ring 72 has fixed to its upper face 75 a plurality of identical segmental holders 76 radially equispaced from and angularly equispaced around the axis 3. Each of these holders 76 defines an axially extending and radially outwardly open seat 77 for a receptacle 78, here as seen in FIG. 1 a shell casing formed as a tubular sleeve having cylindrical and coaxial inner and outer surfaces 79 and 80 and planar lower and upper ends 81 and 82 perpendicular to the axis of these surfaces. Each of these casings 78 sits with its face 81 on the upper face 75 of the ring 72 so that its upper face 82 engages up against a planar lower face 83 perpendicular to the axis 3 of a respective radially outwardly projecting upper rim 84 of the respective holder 76. Meanwhile the outer surface 79 of the casing 78 is in contact with a complementarily shaped recess 85 formed in this upper rim 84 of the holder 76. The part-cylindrical recesses 85 of the holders 76 are centered on axes 86 fixed relative to the mount 50, parallel to the axis 3, radially equispaced therefrom, and angularly equispaced thereabout. The diameter of each recess 85 is the same as that of the outer surface 79 of a casing 78 so that when the casings 78 are positioned in the respective seats 77 of the holders 76 in the above-described position their axes lie on the respective axes 86.

The upper rims 84 of the holders 76 lie on an imaginary cylinder 87 centered on the axis 3 and including the axes 86 so that the surface 85 of each seat 77 is approximately semicylindrical and centered on the respective axis 86.

In the illustrated embodiment of the invention the mount 50 is rotatee by a motor (not shown) through the gear 53 about the axis 3 on the pivot 2 in a direction 88 identical to the direction 49. The angular speed of the mount 50 in the direction 88 relative to the pivot 2 is established to produce at the seats 77 a peripheral speed equal to the transport speed of the casings moving along their production path at this location. This angular speed is in any case smaller than the comparable speed of the sleeve 8 and the plate 11 in the direction 49 relative to the fixed pivot 2 so the the mount 50 and elements carried by it rotate relative to the sleeve 8 and plate 11 in a direction opposite the direction 49 of rotation of this plate 11 relative to the fixed pivot 2.

This rotation of the mount 50 and the elements carried by it in the direction 88 relative to the fixed pivot 2 successively passes each of the seats 77 through an intake station 89 where it is supplied with an empty casing 78 and then to a takeoff station 90 where the casings 78 fitted with primer caps 26 are taken back.

The intake station 89 is advantageously defined by a wheel 150 having an axis 91 parallel to the axis 3 and rotated by an appropriate drive about this axis 91 relative to the fixed support 1 in a direction 92 opposite the direction 88. The wheel 150 has a cylindrical outer edge 93 centered on its axis 91 and formed with seats 94 that are approximately semicylindrical and centered on axes 95 parallel to the axis 91. These axes 95 lie on the cylinder defined by the outer edge 93 of the wheel 150. The radius of curvature of each of these seats 94 is identical to that of a casing surface 79.

The outer surface 93 of the wheel 150 is tangent to the imaginary cylinder 87 at a plane 96 including the axes 3 and 91 and the peripheral speeds of the wheel 150 and mount 50 relative to the fixed support 1 are, due to the uniform angular spacing of the seats 94 about the axis 91 and of the seats 77 around the axis 3, such that the seats 94 and 77 following one another in the direction 92 and in the direction 88 come into positions with their respective axes 95 and 86 and aligned in the plane 96. In this position these seats 94 and 77 define a shape complementary to the outside shape of a casing 78.

The casings 78 are introduced one by one into the different seats 94 of the wheel 150 by unillustrated means known per se, then are held by a cylindrical guide edge 97 in the seats 94 as the wheel 150 rotates in the direction 92 until each of their axes, coaxial with the axis 95 of the respective seat, aligns with the axis 86 of a seat 77 at the plane 96. This guide edge 97 is centered on and turned toward the axis 91 and is of a radius of curvature generally equal to that of the surface 93 of the wheel 150 plus the radius of a casing 78. This edge 97 which is upstream of the plane 96 between the axes 91 and 3 relative to the directions 49, 88, and 92 ends just upstream of this plane 96.

Spaced slightly downstream of the downstream end of this edge 97 and just upstream of the plane 96 is the upstream end of a cylindrical guide edge 98 centered on and turned toward the axis 3 and having a radius of curvature generally equal to that of the cylinder 87 plus that of a casing 78. This guide edge 98 is defined by the inner surface of a crescent-shaped member 99 fixed on the support 1.

The guide edge 98 which retains the casings 78 in the seats 77 radially inward toward the axis 3 extends from the intake station 89 to the output station 90, more exactly to immediately downstream of a plane 100 including the axis 3 and downstream of the plane 96 relative to the rotation direction 88 by an angle beta that is as small as possible, here 65°. This plane 100 is defined by the axis 3 and by an axis 101 parallel to this axis 3, spaced therefrom the same distance as the axis 91, and belonging to a wheel 102 identical to the wheel 150. More particularly, this wheel 102 has a cylindrical outer edge 103 centered on the axis 101 and having a diameter identical to that of the outer edge 93 of the wheel 150 and formed at this outer edge 103 with seats 104 identical to the seats 94 and of the same number and angular spacing as same. The wheel 102 is rotated about the axis 101 relative to the support 1 in a direction 105 identical to the direction 92 and at the same angular speed as the wheel 150 so as to successively pass its seats 104 through a position in which their axes 106, which lie on a cylinder defined by the outer edge 103, coincide at the plane 100 with the axis 86 of a seat 77. Immediately dowmstream of the downstream end of the edge 98 is the upstream end, relative to the rotation direction 105, of a cylindrical guide edge 107 centered on the axis 101 and having a radius of curvature identical to the substantially identical but spectrally opposite edge 97. This guide edge 107 extends downstream relative to the direction 105 to unillustrated means that take the casings 78 out of the seats 104.

It should be noted that, due to the relative positions of the intake station 89 and output or takeoff station 90, the seat or seats 77 that are at a given moment in a position such that their axes 86 are in the angle beta defined between the planes 100 and 96 are empty, that is not provided with a casing. Downstram of the plane 96 between the axes 91 and 3 and upstream of the plane 100 between the axes 101 and 3, relative to the rotation direction 88, each seat 77 holds with the guide edge 98 a casing 78 in a position such that the axes of the casings 78 thus held lie on the axes 86 of the respective seats 77, being spaced uniformly about the cylinder 87.

The purpose of the illustrated apparatus is to introduce into the interior of each of the casings thus positioned one of the primer caps 26 carried on the upper face 12 of the plate 11 and that have migrated toward the outer edge 14 of same.

To this end at each of the axes 86 there is a cylindrical bore 108 centered on the axis, having a diameter about equal to the diameter d of a primer cap 26 (see FIG. 7), and traversing the assembly formed by the rings 55 and 72 from the lower face 65 of the ring 55 to the upper face 75 of the ring 72. Thus each time a casing 78 is fitted in a seat 77 its inner edge 80, whose diameter is also about equal to the diameter d of a primer cap 26, forms an upward extension of the respective bore 108.

Slidable in each of these bores 108 is a respective cylindrical punch 109 centered on the respective axis 86 and having a planar upper end face 110 transverse to the axis 86. Each of these punches 109 is fixed at its lower end on a punch support 111 slidable along but not rotatable about the respective axis 86 in respective guide posts 112 of the mount 50.

The punch 109 can therefore move by sliding of the punch support 111 in the posts 112 between a lower position in which a stop 113 carried by the punch support 111 engages down against one of the guide posts 112 and in which the upper face 110 of the punch 109 is coplanar with the upper face 12 of the plate 11 inside the respective bore 108 and an upper position in which the face 110 is coplanar with the upper face 75 of the ring 72, or above this face 75 but in any case below the face 83 of a seat 77 by a distance equal at least to the height h of a primer cap 26.

A compression-type coil spring 114 between a collar 115 of the punch support 111 and one of the guide posts 112 of same urges the punch support 11 into the lower position described above. The punch 109 is moved from this lower position by engagement of a roller 116 on a track 118. Each such roller 116 is rotatable on the lower end of the respective punch support 111 about an axis 117 lying in a plane including the axis 3 and the axis 86 of the respective punch 109 but perpendicular to these axes 3 and 86.

The roller track 118 fixed on the support 1 has a shape such that the punch 109 is in the lower position when the respective seat 77 passes the intake station 89, then rises relative to the fixed support 1 to its upper position. In this upper position if the upper face 110 of the punch 109 is coplanar with the upper face 75 of the ring 72 this position can be maintained until the respective axis 86 of the puch comes to the plane 100 at the output station 90. The punch does not move back down into its lower position until afterward, during travel through the dead angle beta so as assume this lower position as it reaches the plane 96 at the intake station 89. If on the contrary in the upper position the upper surface 110 of the punch 109 projects above the face 75 of the ring 72, that is to engagement of the upper end of the punch inside the casing 78, it is imperative that the lowering movemnet of the punch 109 relative to its upper position start before the punch 109 orbits to the plane 100 at the takeoff station 90 so that the upper face 110 of the punch 109 on reaching this position is no higher than the upper face 75 of the ring 72. Otherwise the casings 78 could not slide off this face 72.

When the punch 109 is in its lower position, that is mainly at the start of its travel in the direction 88 from crossing the plane 96 at the intake station 89, its upper end face 110 is coplanar with the face 12 to form the floor of a seat otherwise formed by the bore 189. Each such seat can receive a primer cap 26 in a position in which same sits with its bottom surface 31 on the end 110 of the punch 109.

The primer caps 26 can be moved one by one to each of the seats thus defined by a respective passage 119 formed in the ring 55 from the inner edge of same to the mentioned seat. Each passage 119 in the illustrated embodiment extends in a direction 120 and has a width measured perpendicular to this direction 120 in a plane perpendicular to the axis 3 that is about equal to the diameter d of a primer cap 26. In fact each such passage 19 is actually formed by an axially throughgoing slot that traverses the rim 59 from top to bottom. The floors of the passages 119 are defined by the face 12 from the inner edge 60 of the rim 59 to the intersection with the surface 57 which defines the outer edge of the rim 59. From this surface 57 to the bore 108 the floor of each passage 119 is defined by a respective planar face 121 below the upper face 61 of the ring 55 and coplanar with the face 12 of the plate 1. Thus the axially throughgoing groove forming each passage at the rim 59 becomes a groove open axially upward only and terminating at the respective bore 108.

The extension directions 120 of the passages 119 are all identical and such that each passage 119 opens at the inner edge 60 of the rim 59 at a location ahead of the respective bore 108 relative to the rotation direction 49 of the plate 11 relative to the fixed support 1. Such positioning encourages the engagement of the primer caps 26 one by one in the passages 119 not only because of the centrifugal force acting on them, but also because of the rotation of the upper face 12 of the plate 11 in the direction 49 relative to the rim 59 caused by the difference between the rotation speeds of the mount 50 in the direction 88 and the plate 11 in the direction 49 relative to the support 1.

Immediately upstream of the mouth 122 of each passage 119 the inner edge 60 of the rim 59 is formed with a respective radially inwardly open pocket 123 for collecting primer caps 26. The radial outward edge of each pocket 134 has a cylindrical shape centered on the axis 3 and the mouth 122 of the respective passage 119 opens at the downstream end of this outer pocket edge relative to the rotation direction 49. In addition the rim 59 is formed immediately downstream of the mouth 122 of each passage 119 with a radially inwardly extending projection 124 aligned with the downstream edge of the respective passage 119 and generally parallel to its extension direction 120. Thus each such projection 124 is positioned downstream from the respective passage 119 relative to the rotation direction 49. Thus this projection 124 deflects into the respective passage 119 the primer caps 26 in the respective pocket 123. These caps 26 are moved by centrifugal force into these pockets 123 and are urged downstream therein by the difference between the rotation rates 49 and 88.

Figure 3:
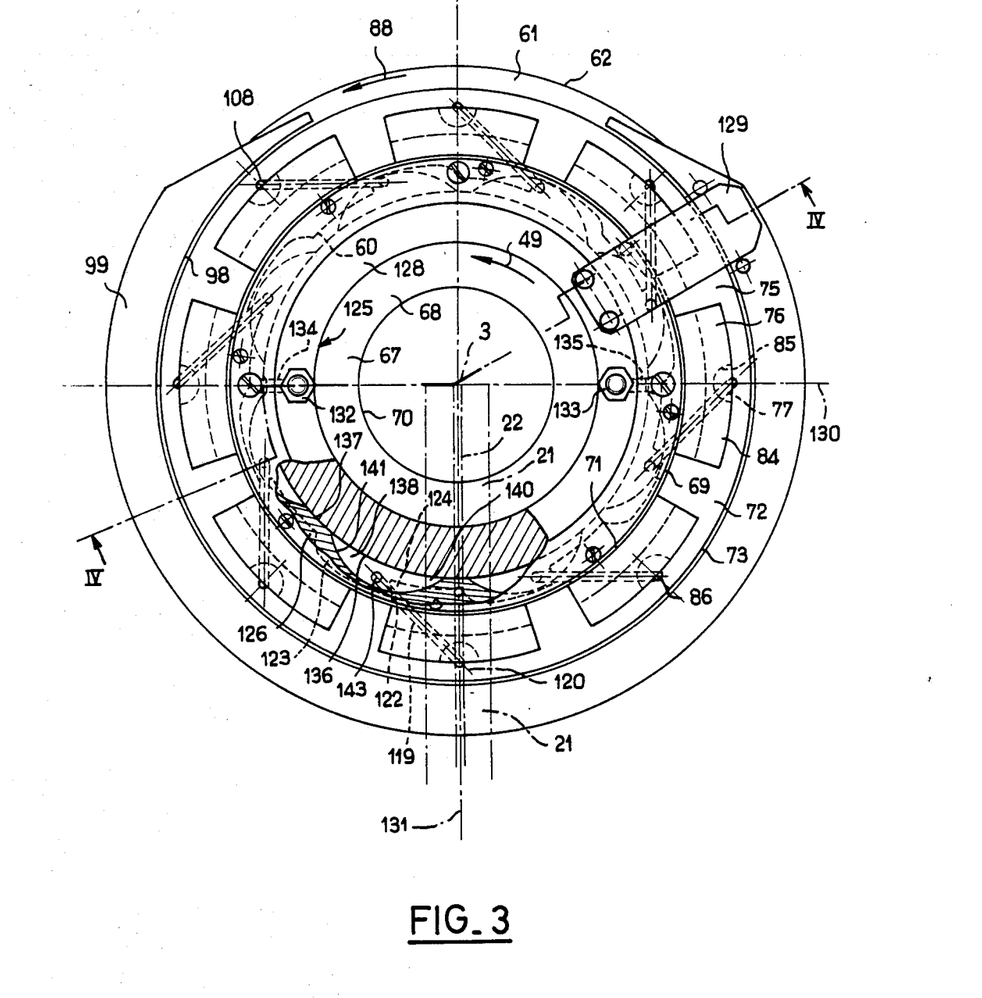
FIG. 3 is a top view of part of the apparatus provided with an auxiliary blower.
Figure 4:
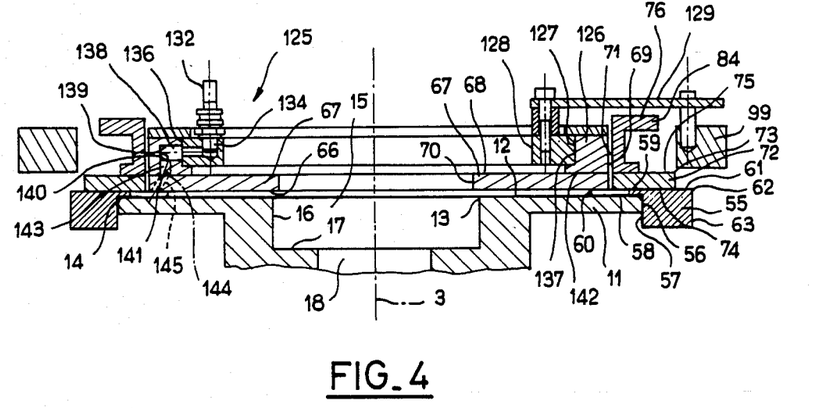
FIG. 4 is a partial sectional view taken along line IV—IV of FIG. 3.

This introduction of primer caps 26 one by one into each of the passages 119 is assisted also by pneumatic means illustrated in FIGS. 3 and 4 which only partially show the elements of the apparatus illustrated in the other figures. Naturally all these elements are also in this embodiment of the apparatus.

FIGS. 3 and 4 show a blower unit 125 that projects a gas, for example air, into two of the passages 119 lying in predetermined positions. This air moves from the passage mouths 122 toward the respective bores 108 so as to apply a supplemental push toward the bores 108 on the primer caps 26 in the passages 119.

To this end a ring 126 is mounted on the upper surface 68 of the cover 67 at a region of same near the outer peripheral surface 69 for joint rotation about the axis 3 therewith. This ring 126 has a radially inwardly and axially upwardly opening stepped recess or seat 127 centered on the axis 3 and in which is rotatable about the axis 3 a ring 128 fixed against rotation relative to the support 1 by attachment with the guide 99 via a dog 129 bridging the path followed by the holders 76 on rotation of the mount 50 around the axis 3 relative to the support 1.

Conduits 132 and 133 are connected to the ring 128 at two diametrically opposite locations here positioned on a common middle plane 130 including the axis 3 and perpendicular to a plane 131 bisecting the angle beta. This plane 131 is also the symmetry plane of the guide 99 and the section plane I—I. These conduits 132 and 133 are connected to a source of air under pressure and they open inside the ring 128 into passages 134 and 135 themselves opening along the plane 130 at an external peripheral surface 136 of the ring 128. This surface 136 is cylindrical, centered on the axis 3, and in contact but rotatable relative to the inner surface 137 of the recess 127 which is also cylindrical and centered on the axis 3.

The surface 137 of the recess 127 is formed inside the ring 126 with a number of recesses 138 equal to the number of passages 119, punches 109, or casing holders 76. Each of these recesses 138 is defined by an upper face 139 and a parallel lower face 140 perpendicular to the axis 3 and by a rounded bottom face 141 that is concave toward the axis 3. In the region of maximum concavity of each cavity 138 the ring 126 is formed with a passage 143 that opens at the lower face 142 of the ring 126, in intimate contact with the upper face 68 of the cover 67. Each passage 143 has in the illustrated example an axis 144 parallel to the axis 3 and perpendicular to the extension direction 120 of the respective passage 119 upstream of the mouth 122 of same with reference to the rotation dirction 88. Across the cover 67 the conduit 143 is connected to a region of the lower face 66 of the disk 67 located immediately adjacent the mouth 122 of the respective passage 119 by an inclined passage 145 extending downward toward the interior of the passage 119 to blow air into it toward the respective bore 108.

The apparatus functions as follows:

The plate 11 and the mount 50 are driven by their respective motors for rotation about the axis 3 relative to the support 1, the former at an angular speed greater than that of the latter relative to the support 1.

The primer caps 26 are fed by the passage 22 which is unblocked by the finger 36 onto the upper face 12 of the plate 11, with which they are in contact by their bottom surfaces 31. The rotation of the plate 11 causes the primer caps 26 to move toward the outer edge 14 of the upper surface 12 of same where they come into contact with the inner edge 60 of the rim 59 and rotate about themselves due to the difference between the rotation speeds of the rim 59 and of the face 12. These caps 26 thus accumulate in the pockets 123 and in each of the passages 119 toward which they are deflected by the projections 124. In each of the passages 119 the primer caps 26 move toward the respective bore 108 in a respective single-file row.

If one pictures the path followed by a portion of the mount 50 corresponding to one of the axes 86 of same, when the axis 86 crosses the plane 96 at the intake station 89 a casing 78 is taken on by the respective seat 76 in a position in which the axis of this casing 78 coincides with the axis 86. The respective punch 109 is then in its lower position in which its upper face 110 is coplanar with the upper face 12 of the plate 11. Due to the rotation of the plate 11 in the direction 40 about the axis 3 at a speed greater than that of the ring 55 and rim 59, as well as to the inclination of the passages 119, the introduction of a row of primer caps 26 in the respective passage 119 brings one of these caps 26 inside the bore 108 into a position in which it sits with its face 31 on the upper face 110 of the punch 109.

As the rotation of the mount 50 in the direction 88 relative to the fixed support continues, the cavity 138 communicating with the mouth 122 of the passage 110 in question enters into communication with the passage 134 connected via the connection conduit 132 to the source of gas under pressure. The compressed air pushes the cap 26 thus placed in the bore 108 against the wall of same, that is into an exact position with the cap axis 28 coinciding with the axis 86.

The roller track 118 for the rollers 116 dips as it crosses the plane 96 so that the punches 109 lie in their low position when their axes 86 cross this plane 96 at the intake station. As each axis 86 crosses the plane 130 the first blow is effected, thereby moving a cap 26 that might be slightly stuck in the passage 119 into the bore end thereof, so that it sits coaxially atop the respective surface 110.

Thereafter the roller track 118 lifts the punch 109 into its upper position, thus pushing the cap 26 up into the casing 78 in which it is a tight friction fit. As the punch 109 thus rises it impedes any movement of the caps contained in the passage 119 toward the respective bore 108.

When the axis 86 thereafter crosses the plane 130 for the second time the caps 26 contained in the respective passage 119 are subjected to another blow due to connection of the passage 135 via the connection conduit 133 with the source of gas under pressure. This effects a new placement of caps 26 in the passage 119.

If the rising movement of the punch is accompanied by a penetration of the upper end of same into the respective casing, the punch 109 starts its return movement toward its lower position well upstream of the takeoff station 90. The track 118 against which the roller 116 is pressed by the spring 114 has to this end a descending shape in the rotation sense 88.

The casing 78 provided internally with a cap 26 is taken off at the output station 90 as soon as the axis 86 crosses the plane 100 at the level of this output station.

Once the punch 109 has returned to its lower position, freeing the region of the bore 108 above the face 12 of the plate 11, the caps 26 in the respective passage 119 again migrate away from the axis 3 along the passage 119 until one of them comes to the bore 108 and rests by its base surface 31 on the upper face 110 of the punch 109. The row of caps 26 in the passage 119 then stops again.

This cycle is then repeated.

As explained above if the caps 26 accumulate excessively on the upper face 12 of the plate 11, they pivot the arm 47 toward the position 47a and interrupt the flow of the caps 26 in the passage 22 by means of the finger 36 until the surplus of caps 26 is exhausted in the fashion described above via the passages 119 to fill the casings 78. Once the surplus is thus exhausted the arm 47 returns to its solid-line position thus freeing flow of the caps 26 in the passage 22.

Each punch 109 is mounted elastically on the respective punch support 11 so as to prevent damage if a cap gets caught when moving up inside a casing 78 as shown diagrammatically at 146 and means for doing this which are within the province of the person skilled in the art are provided to assure that each punch 109 comes into its predetermined upper position as it rises so as to signal to the operator an emergency condition that there is a malpositioned cap which could lead to an incorrect filling of the seat of the respective casing 78 and could create an explosion of the cap 26 when the casing 78 is extracted.

The embodiment of the invention described above is only a single nonlimitative example, and one could vary quite a bit from it without leaving the scope of the invention, for example by using the apparatus for something continuously other than the mounting of primer caps 26 in casings 78.

In the particular case of positioning primer caps 26 of munitions in casings, an apparatus of the type described above having eight holders 76 for casings 78, a dead angle beta of about 60°, a rotation speed of the mount 50 relative to the support 1 of about 50 revolutions per minute, and a rotation speed of the plate 11 relative to this same support of about 80 to 100 revolutions per minute, can fit about 400 primer caps 26 per minute in respective casings 78. These figures give a nonlimitative example of the substantial progress relative to the prior-art techniques described above.

The accumulation of the primer caps 26 in the passages 119 makes it possible to constantly feed the bores 108, that is to surely introduce one cap in each respective seat of a casing whereas the prior-art apparatuses use a random distribution which leaves empty holes which it is necessary to detect.

The apparatus according to this invention is particularly useful in the handling of workpieces having a cylindrical shape as described, or of polygonal section with a ratio of average diameter to total height near 1 in the case of a hollow object whose center of gravity is situated at least in its bottom half, and near about ½ in the case of a solid workpiece. Naturally these shapes and figures are given as a nonlimitative example. Nonetheless, the shape and dimension of the object that one can fit according to the invention into holes of receptacles circulating continuously in a loop can vary considerably, the necessary changes of the apparatus being within the capacities of the person skilled in the art. Similarly the invention described above can be adapted to other operations for fitting objects into individual receptacles separated in a row at a predetermined spacing, or more generally to put objects into predetermined positions relative to any type of receptacle, without otherwise leaving the scope of the instant invention.

We claim:

1. An apparatus for fitting receptacles at a predetermined spacing with respective substantially identical objects each having a bottom face, each recectacle having for the respective object a hole opening downward at the respective bottom face, the apparatus comprising:

a fixed support;

a plate generally centered on an upright plate axis and having a substantially planar, smooth, and horizontal upper face with a generally circular outer edge;

means for rotating the plate relative to the fixed support in a predetermined direction about the plate axis;

means for depositing the objects on the upper face of the plate radially inward of the edge thereof such that these objects sit on this upper plate face by their bottom faces;

means forming a plurality of individual seats distributed at the spacing of the receptacles along the outer edge of the upper face of the plate and each having a floor coplanar with the upper plate face and a shape complementary with that of one of the objects;

a guide member having an inner edge above the upper face of the plate immediately adjacent same, and a plurality of respective passages which each open at one end at this inner edge and at the other end at the respective seat, each such passage being so dimensioned that the objects can pass one by one from the inner edge to the respective seat;

means for exerting on the objects a radially outwardly directed force urging them toward the outer edge of the face and toward the seats via the passages of the guide member, the means for exerting including:

means for rotating the plate about the plate axis at such a speed that the resultant centrifugal force moves the objects radially outward, and means for rotating the seats and the guide member about the plate axis opposite to the predetermined direction relative to the plate;

means including respective receptacle holders fixed relative to the seats and to the guide member for temporarily holding a respective receptacle above each seat in a position in which this receptacle is positioned with its hole for the object as an upper extension of the seat, these holders and their receptacles therefore orbiting about the plate axis as the plate rotates thereabout;

means for feeding the receptacles to the holders and means for taking the receptacles from the holders at respective intake and output stations along the outer plate edge during rotation of the seats and guide member;

respective punches at the seats in vertical alignment therewith, each punch being vertically slidable relative to the respective seat and to the guide member and having a substantially planar upper end movable between an upper position in which it is coplanar with the upper face of the plate to define the floor of the respective seat and a lower position in which it lies above the upper face of the plate; and means for sliding the punches as the seats and guide member orbit so that each punch is in the lower position in the intake station and moves into the upper position between the intake station and the output station for thereby pushing an object up into each hole as the respective receptacles travel from the intake to the takeoff stations.

2. The apparatus defined in claim 1 wherein each object has perpendicular to the respective bottom face a predetermined height, the apparatus further comprising a cover having a substantially planar and horizontal lower face spaced a distance from the upper plate face equal to slightly more than the predetermined object height.

3. The apparatus defined in claim 1 wherein each passage opens at the inner edge of the guide member at a location offset upstream relative to the predetermined rotation direction from the respective seat.

4. The apparatus defined in claim 3 wherein the inner edge of the guide member has immediately downstream of each location on the inner edge of the guide member at which opens a passage a projection positioned to deflect the objects into the respective passage.

5. The apparatus defined in claim 3 wherein the inner edge of the guide member has immediately upstream of each location of the inner edge of the guide member at which opens a passage a radially inwardly open pocket for accumulating the objects.

6. The apparatus defined in claim 3, further comprising means for blowing a gas into the passages from the location at which same open at the inner edge of the guide member toward the respective seats.

7. The apparatus defined in claim 1 wherein the means for jointly rotating the seats and the guide member about the plate axis relative to the plate includes means for jointly rotating the seats and the guide member about the plate axis relative to the plate in the predetermined direction at an angular speed smaller than that of the plate.

8. The apparatus defined in claim 1 wherein the feeder includes a tube having a passage of generally the same section as the objects and having a lower end opening generally parallel to the upper face and level therewith.

9. An apparatus for fitting objects into respective holes of respective substantially identical receptacles each having a bottom face at which the respective hole opens, the apparatus comprising:

a fixed support;

a plate generally centered on an upright plate axis and having a substantially planar, smooth, and horizontal upper face with a generally circular outer edge;

means for depositing the objects on the upper face of the plate radially inward of the edge thereof such that these objects sit on this upper plate face by their bottom faces;

means forming a plurality of upwardly open seats distributed at a predetermined spacing along the outer edge of the upper face of the plate and each having a floor coplanar with the upper plate face and a shape complementary with that of one of the objects;

a guide member having an inner edge above the upper face of the plate immediately adjacent same, and a plurality of respective passages which each open at one end at this inner edge and at the other end at the respective seat, each such passage being so dimensioned that the objects can pass one by one from the inner edge to the respective seat; and means for rotating the plate relative to the fixed support in a predetermined direction about the plate axis and thereby centrifugally urging the objects radially outwardly toward the inner edge and along the passages and into the seats via the passages of the guide member.

10. The apparatus defined in claim 9 wherein the means for rotating the plate rotates the seats and the guide member about the plate axis in the same direction as the plate but at a lower speed, the passages opening at the inner edge in a direction directed generally forwardly in the rotation direction.

11. The apparatus defined in claim 10, further comprising means including respective receptacle holders fixed relative to the seats and to the guide member for temporarily holding a respective receptacle above each seat in a position in which this receptacle is positioned with its hole for the object as an upper extension of the seat, these holders and their receptacles therefore orbiting about the plate axis as the plate rotates thereabout;

means for feeding the receptacles to the holders and means for taking the receptacles from the holders at respective intake and output stations along the outer plate edge during rotation of the seats and guide member;

respective punches at the seats in vertical alignment therewith, each punch being vertically slidable relative to the respective seat and to the guide member and having a substantially planar upper end movable between an upper position in which it is coplanar with the upper face of the plate to define the floor of the respective seat and a lower position in which it lies above the upper face of the plate; and means for sliding the punches as the seats and guide member orbit so that each punch is in the lower position in the intake station and moves into the upper position between the intake station and the output station for thereby pushing an object up into each hole as the respective receptacles travel from the intake to the takeoff stations.

* * * * *